June 12, 1945.  E. P. WORTHEN ET AL  2,378,350
SINGLE EFFECT EVAPORATOR
Filed March 24, 1944   7 Sheets-Sheet 1

Inventors
Eugene P. Worthen
and Benjamin Fox.
By R. S. A. Dougherty
Attorney

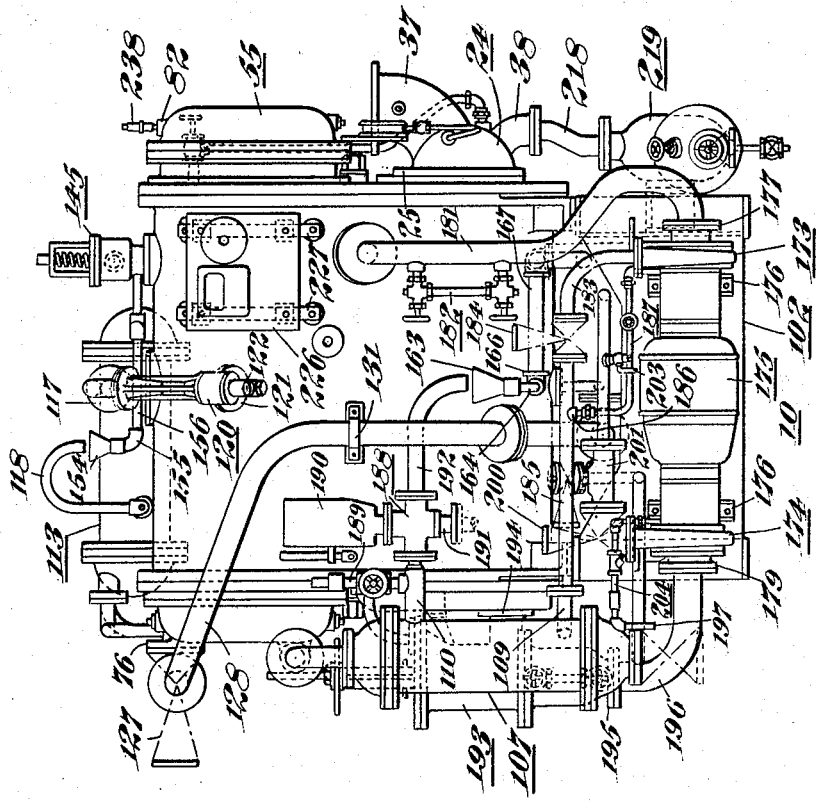

June 12, 1945.  E. P. WORTHEN ET AL  2,378,350
SINGLE EFFECT EVAPORATOR
Filed March 24, 1944  7 Sheets-Sheet 3

Inventors
Eugene P. Worthen
and Benjamin Fox.
By R. S. C. Dougherty
Attorney

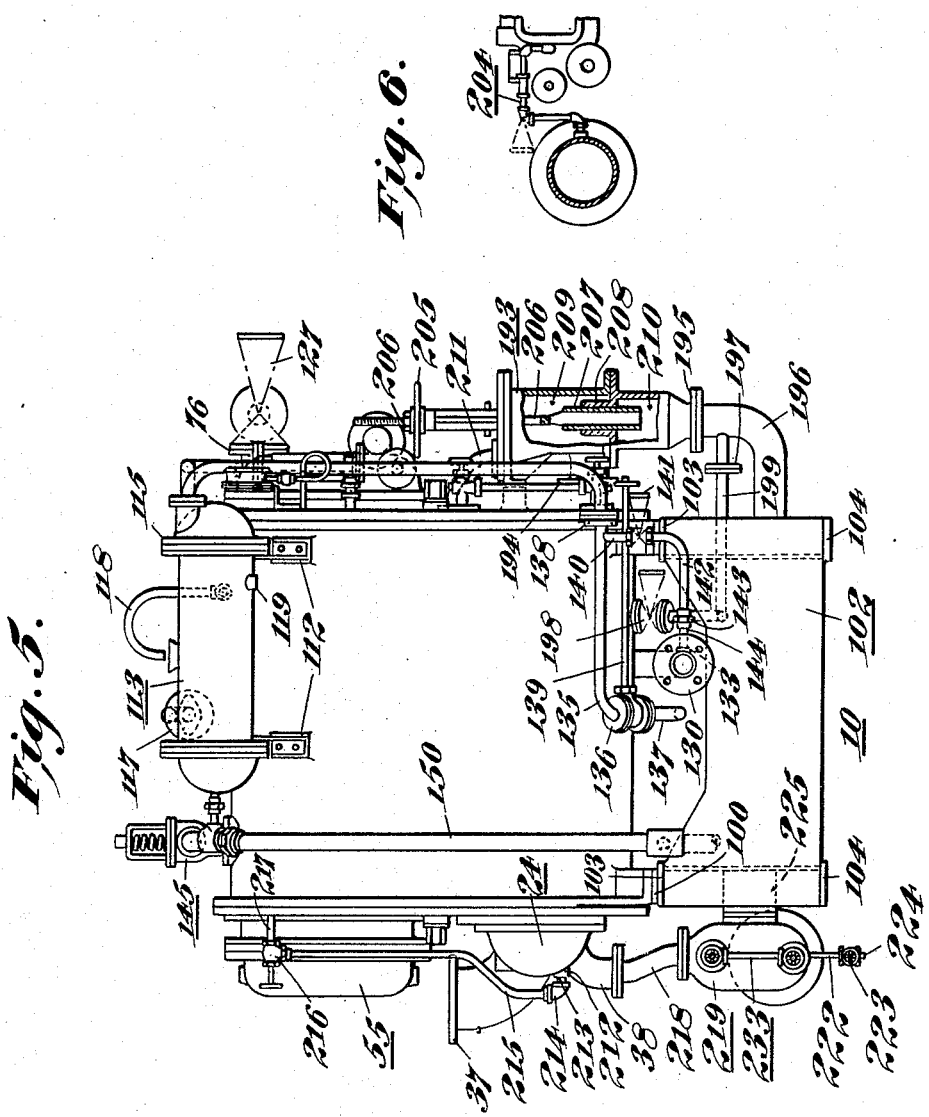

Inventors
Eugene P. Worthen
and Benjamin Fox.
By R. S. C. Dougherty
Attorney

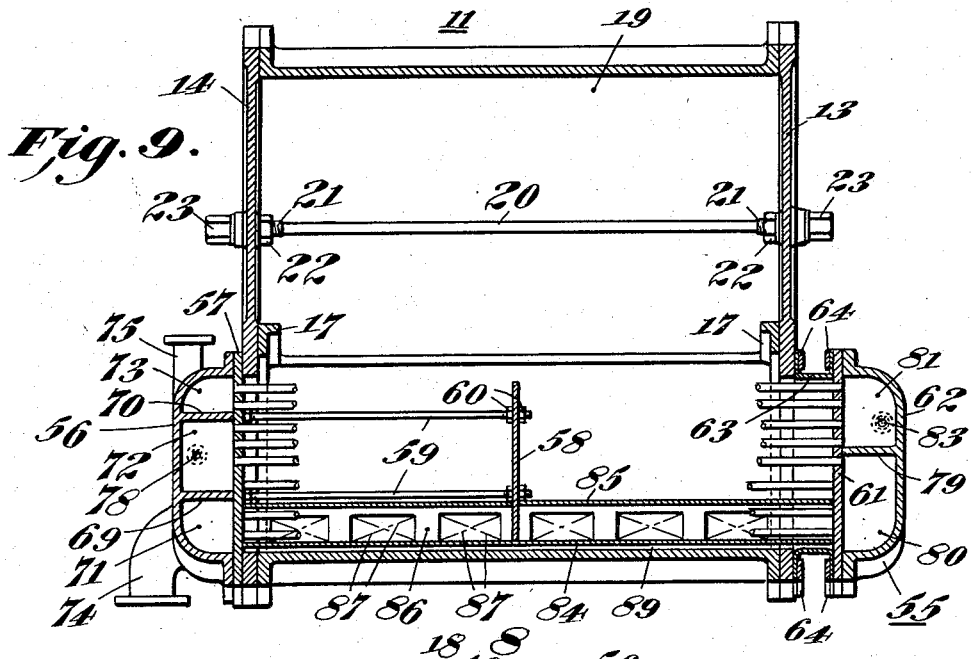
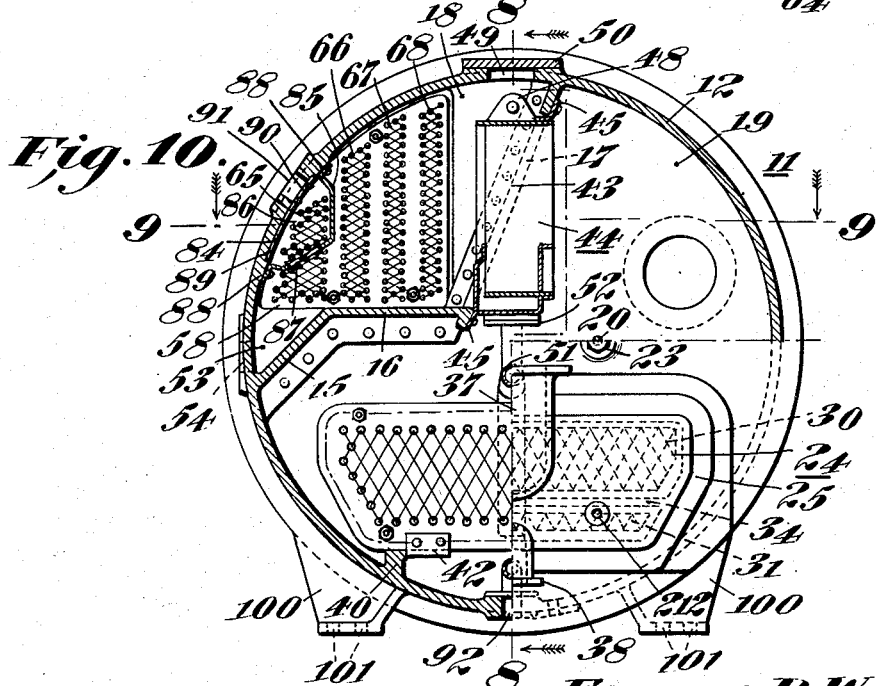

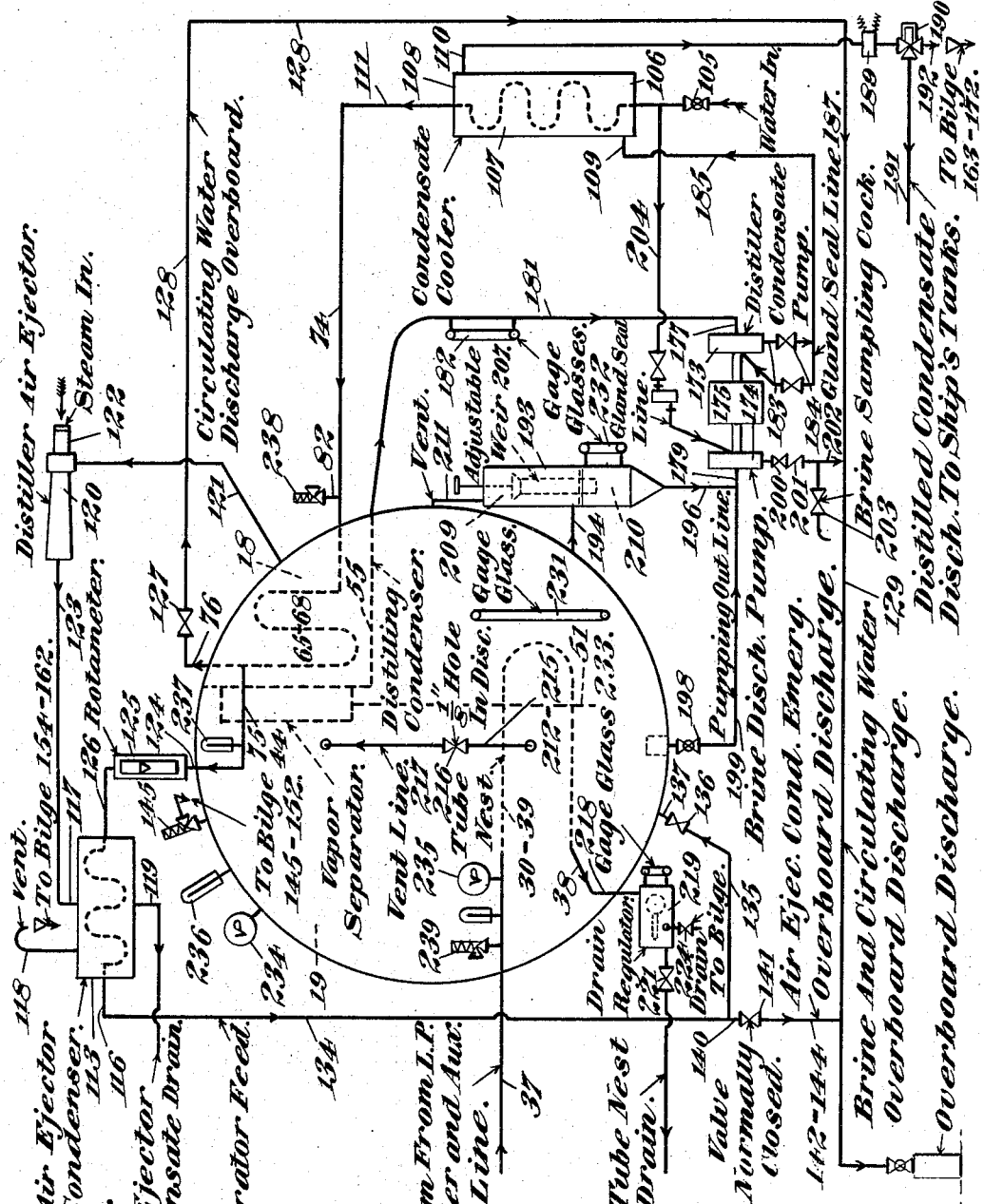

Patented June 12, 1945

2,378,350

UNITED STATES PATENT OFFICE 2,378,350

SINGLE EFFECT EVAPORATOR

Eugene Porter Worthen, Braintree, and Benjamin Fox, Wollaston, Mass., assignors, by mesne assignments, to Buena Vista Iron Company, a corporation of New Jersey Application May 24, 1944, Serial No. 537,026

12 Claims. (Cl. 202—185)

This invention relates to an improved apparatus for evaporating and distilling, and especially to such apparatus as is intended for use on board ships and the like where it is necessary to supply the fresh or pure water demands from sea water in a most efficient and economical manner as regards space and weight. Such demands are occasioned by the losses of fresh water, such as to the operation of the ship's machinery, such as condensers, turbines, boilers, auxiliary engines, and the like, together with the ship's human needs, such as drinking water.

Heretofore apparatus of this description has commonly comprised apparatus in which there are a plurality of the essential units in the way of heaters, condensers, pumps, traps, and the like, each unit constituting to a more or less degree, an individual unit requiring its own container, or casing, together with its piping and its accessories, and occupying a space by itself. Many such apparatus though highly efficient as to operation have proven, especially on ships, to be uneconomical with regard to weight and space requirements, and some have been inefficient in operation due to losses incurred by the greater surface area exposed to radiation of the individual units and connected piping. With such prior art in mind it has been the especial object of our invention to develop a highly integrated unitary apparatus for the evaporation and distilling of sea water, which will at the same time be compact and convenient of operation, and will maintain a high degree of operating efficiency with respect to its weight and space requirements.

It is also an especial object of our invention to combine into a so-called single effect apparatus the various necessary units required for the evaporating and distilling of sea water on board ships and to mount these units into and upon a single shell container and its sub-base in such a manner that their combined efficiency when based upon weight and space requirements is maintained at a high standard.

Another object of our invention is to arrange the various necessary units required for an apparatus for the evaporating and distilling of sea water within and upon said single shell container with due regard for their sequential and cooperating relationships to the end that a further economy and efficiency of operation, and a further saving in weight and space results thereby.

A further object is to meet the demands of a ship's requirements for evaporating and distilling sea water by installing in the apparatus therefor a plurality of control devices, more or less automatic in their operation, to the end that once having been started and steadied down the apparatus when operating will require no manual attention other than routine inspection at infrequent intervals thereafter.

A further object of our invention is to provide an apparatus for the evaporating and distilling of sea water which by reason of its comprising within a unitary and compact design all the necessary elements thereof mounted upon a single foundation simplifies its installation and results in convenience and efficiency when in operation.

Other objects and advantages will be apparent from the following description wherein reference is made to the accompanying drawings illustrating the preferred embodiment of our invention and wherein similar reference numerals designate similar parts throughout the several views.

Fig. 2 is a side elevation thereof.

Fig. 5 is a side elevation opposite to that of Fig. 2, and in which the condensate cooler is not shown.

Fig. 6 is a detail view showing in plan the brine pump gland sealing arrangement.

Figs. 7 to 10, inclusive, show details of the container shell assembly together with certain elements contained therewithin.

Figure 7:
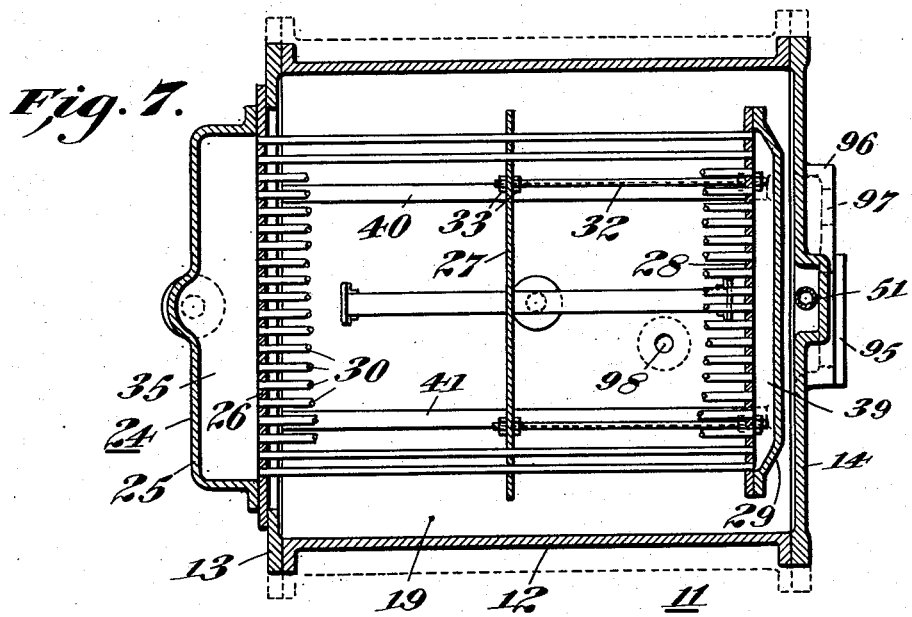
Figure 8:
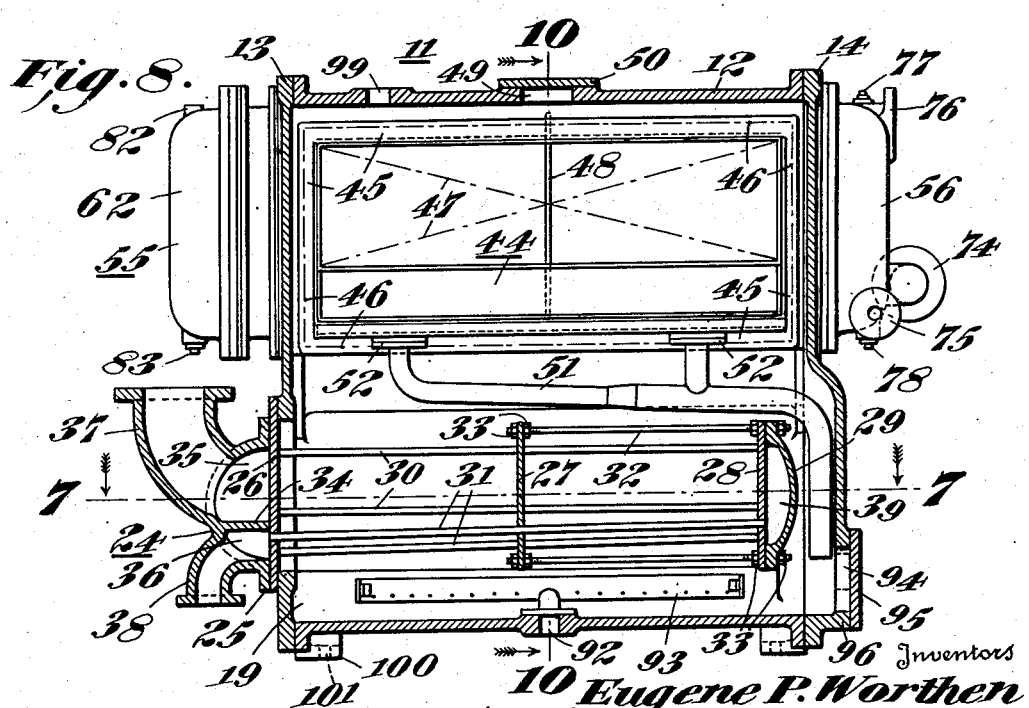

Fig. 7 is a section taken along the line 7—7 of Fig. 8 viewed in the direction of the arrows.

Fig. 8 is a sectional elevation taken along the line 8—8 of Fig. 10 viewed in the direction of the arrows.

Fig. 9 is a section taken along the line 9—9 of Fig. 10 viewed in the direction of the arrows.

Fig. 10 is a three-quarter·section taken along the line 10—10 of Fig. 8 viewed in the direction of the arrows.

Fig. 11 is a drawing representing in diagrammatic form the flow system of the liquids to be distilled, the heating fluids thereof, and the condensate collecting means in an evaporating and distilling apparatus embodying our invention.

Referring now to the drawings the numeral 10 designates our improved evaporating and distilling apparatus as a unit. The numeral 11 designates the container shell which preferably is made up of castings comprising the cylindrical casing 12, the steam inlet end head 13, and the operating end head 14. This structure 11 constitutes the tank or container for the body of sea water (or other liquid) to be evaporated and distilled, and also acts as the mounting for the various units required to accomplish the said evaporation or distillation.

It may be noted in Figs. 7 to 10, inclusive, that the cylindrical casing 12 is divided structurally longitudinally into two chambers by the angularly disposed longitudinal wall members 15, 16 and 17. The upper smaller quarter-segment-like space we designate as the distilling condenser chamber 18; while the remaining three-quarter-segment-like space we designate as the evaporating chamber 19.

For additional strength and rigidity against collapse of the heads 13 and 14 a stay-bolt 20 extends longitudinally through the chamber 19 and through bolt-holes in the heads 13 and 14 and is provided at each end with screw-threads 21 for the nuts 22 and 23.

Contained within the lower part of the evaporating chamber 19 is the heater 24. The heater 24 is an integral unit and is removably attached as such to the head 13. The heater 24 comprises the exterior head 25, the exterior tube sheet 26, the intermediate tube sheet 27, the interior tube sheet 28, the interior head 29, the upper nest of tubes 30, the lower nest of tubes 31, and space bolts 32 threaded for nuts 33. The exterior head 25 is provided with a horizontally disposed division wall 34 which together with the exterior tube sheet 26 forms the upper enclosed chamber 35, and the lower enclosed chamber 36. An integral flanged elbow 37 communicating with the chamber 35 extends outwardly and upwardly, while an integral flanged elbow 38 communicating with the chamber 36 extends outwardly and downwardly from said head 25. The interior tube sheet 28 together with the interior head 29 forms a chamber 39. From this construction it will be seen that the upper nest of tubes 30 communicates the chamber 35 with the chamber 39, while the lower nest of tubes 31 communicates the chamber 39 with the chamber 36. The lower nest of tubes 31 is sloped downwardly from the head 28 toward the head 26, in order to facilitate the discharge of condensates from the chamber 39 to the chamber 36.

Preferably cast integral within the cylindrical casing 12 along the lower interior wall and longitudinally thereof are the slide ribs or tracks 40 and 41. These tracks 40 and 41 serve to support the heater 24 by engaging the lower edges of the tube sheets 27 and 28. Guide lugs 42 suitably attached to the tube sheets 27 and 28 serve to engage the tracks 40 and 41 to locate and guide the heater in removal and replacement when required for cleaning or repairs.

The distilling condenser chamber 18 communicates with the evaporating chamber 19 through an orifice 43 formed in the wall 17. The orifice 43 extends nearly to the peripheral limits of the wall 17 both vertically and horizontally. Removably attached to the evaporating chamber side of the wall 17 and commanding the orifice 43 is the vapor separator 44 attached by means of flanges 45 thereof. Conventional attaching means such as machine screws (not shown) are used, and their lines of attachment along the flanges 45 are indicated in Fig. 8 by means of the dot-and-dash lines 46.

The vapor separator 44 is preferably of that type disclosed and claimed in the copending patent application Serial No. 444,676, filed May 27, 1942, by E. P. Worthen et al. (issued as Patent 2,368,588, Jan. 30, 1945). As the details of this separator 44 are not elements in the subject matter of this present application it will not be further described herein—it is only necessary for the purpose of the present application that the vapor separator 44 be an efficient device for the removal of moisture containing salt from the vapor generated from the distilland in the evaporating chamber 19, and to return the said moisture to the said distilland, and to pass on for condensation to and within the distilling condenser chamber 18 a maximum flow of the generated vapor so purified as to be within the permissible degree of salinity. The passageway for the vapor through the separator 44 is indicated conventionally by the crossed dot-and-dash lines 47 in Fig. 8. For convenience in manipulating the separator when necessary for removal and replacement in case of cleaning or making repairs a lifting lug 48 is provided structurally integral with the separator 44. In order to gain access to said lifting lug 48 an orifice 49 is provided in the top of the cylindrical casing 12, and which orifice is normally closed by the removable cover plate 50. In order to return the drainage from the separator 44 to the body of the distilland below and beneath the surface thereof within the evaporating chamber 19, drainage pipe 51 is provided comprising removable flanged attachments 52 at the bottom of the separator 44.

Within the distilling condenser chamber 18 in the lower portion thereof an angularly shaped trough space 53 is formed by the wall 15 in conjunction with the peripheral wall of the cylindrical casing 12 and serves to collect the condensate drainage. An orifice 54 communicates this trough space 53 with the exterior of the cylindrical casing 12.

Contained within the distilling condenser chamber 18 is the distilling condenser 55. The distilling condenser 55 is a unit removably attached to the heads 13 and 14, respectively. It comprises the conduit head 56, the conduit head tube sheet 57, the tube sheet support plate 58, the tube sheet support plate tie-rods 59 with nuts 60, the cover plate head tube sheet 61, the cover plate head 62, the expansion joint 63, the joint clamp rings 64, the four sets of tubes 65, 66, 67, and 68, respectively. It will be noted that the conduit head 56 comprises dividing walls 69 and 70 which together with the tube sheet 57 forms the three enclosed chambers 71, 72, and 73, respectively. The chamber 71 is communicated with the exterior through the flanged inlet connection 74, while the chamber 73 is communicated with the exterior through the flanged outlet connection 75. The top of the chamber 73 is also communicated with the exterior through the flanged connection 76 and the vent connection 77. The chamber 72 is communicated with the exterior through the drain connection 78. The cover plate head 62 comprises the dividing wall 79 which together with the tube sheet 61 forms the two enclosed chambers 80 and 81. The chamber 81 is communicated with the exterior through the upper valve connection 82, and the lower plug connection 83. From this construction it will be seen that the nest of tubes 65 communicates the chamber 71 with the chamber 80; and the nest of tubes 66 communicates the chamber 80 with the chamber 72; and the nest of tubes 67 communicates the chamber 72 with the chamber 81; and the nest of tubes 68 communicates the chamber 81 with the chamber 73. In Figs.

9 and 10 it may be noted that a portion of the nest of tubes 65 is separated from the others by means of the baffles 84 and 85 forming an enclosure about the said portion. These baffles 84 and 85 thus form within the distilling condenser chamber 18 an air cooler chamber 86. The distilling condenser chamber 18 is communicated with air cooler chamber 86 by means of a plurality of orifices 87 formed in the baffle 85, and indicated in Fig. 9 by the dot-and-dash lines 87. On the interior of the cylindrical casing 12 are the two spaced-apart shallow longitudinally disposed ribs 88 which serve as attaching strips for the baffles 84 and 85 which are attached thereto by machine screws (not shown). There is thus formed between the peripheral wall of the cylindrical casing 12, the ribs 88, and the baffle 84 a shallow air space 89. The air space 89 is communicated with the air cooler chamber 86 by means of a plurality of orifices 90 (indicated by dot-and-dash lines in Fig. 10), and is communicated with the exterior of the cylindrical casing 12 through the orifice 91.

The cylindrical casing 12 is further provided with an orifice 92 in the bottom thereof which communicates the exterior thereof with a flanged perforated discharge pipe 93 on the interior of the casing 12. The evaporating chamber 19 is further communicated with the exterior through an orifice 94 in the lower portion of the operating end head 14. This orifice 94 is utilized as a cleanout opening and is normally closed by a removable cover plate 95 (see Figs. 8 and 9) mounted on the boss 96. The orifice 97 in this same boss 96 will be further referred to hereinafter. Other orifices communicating the evaporating chamber 19 with the exterior are orifice 98 in the bottom of the cylindrical casing 12 (see Fig. 7), and orifice 99 in the top of the cylindrical casing 12. These orifices 98 and 99 will be further referred to hereinafter.

Cast preferably integral with the cylindrical casing 12 at each end at the bottom thereof are foundation lugs 100 provided with bolt-holes 101.

Referring now to Figs. 1 to 6, inclusive, the assembly of the container shell 11 together with its various attachments are shown mounted as a unit upon a sub-base 102. The sub-base 102 is preferably comprised of steel plates welded together to form a rectangular box-like structure provided with top pads 103, to which are attached the foundation lugs 100 of the cylindrical casing 12, and bottom sub-base floor pads 104. The sub-base 102 also provides support for certain other elements of our apparatus as will be further described hereinafter.

Figure 3:
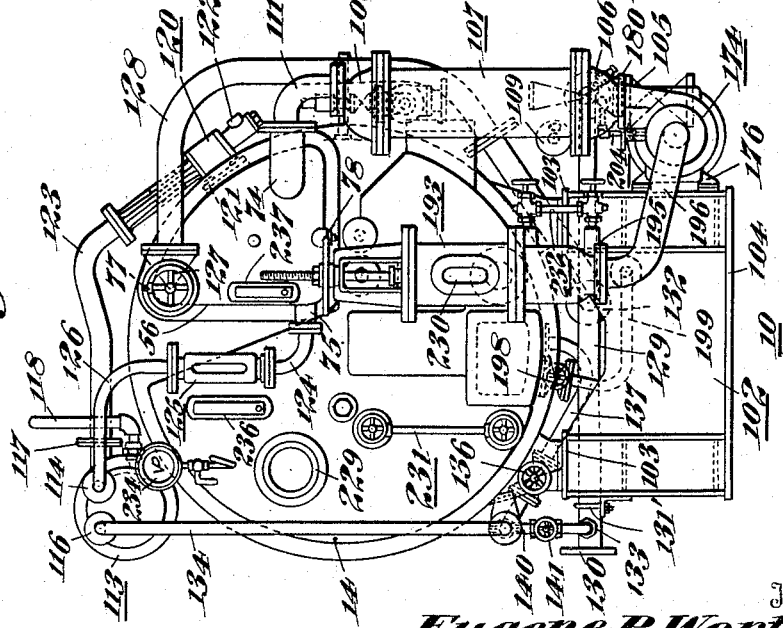
Fig. 3 is an end elevation (operating end) thereof.

Upon the exterior of the container shell 11 and of the sub-base 102 and their attached parts hereinbefore described are mounted various elements of our evaporating and distilling unit 10 which we will now describe. In Fig. 3 may be noted the valve 105 (shown conventionally) which normally will be in communication with the ship's sea chest from which the sea water to be evaporated and distilled and to be used for condenser cooling purposes is drawn. The valve 105 is attached to the inlet head 106 of the condensate cooler 107. The condensate cooler 107 is of conventional design in which cooling water enters the inlet head 106 and passes through a nest of tubes within the cooler 107 to the discharge head 108. The condensate to be cooled enters the cooler 107 through the condensate inlet connection 109 and leaves by way of the discharge connection 110 as will further hereinafter be described. The discharge head 108 communicates with the flanged inlet connection 74 of the distilling condenser 55 through the flanged elbow 111.

Mounted on top of the container shell 11 by means of brackets 112 is the air ejector condenser 113 of conventional design having the cooling water inlet connection 114 in the head 115. The water inlet connection 114 communicates through a return nest of tubes within the condenser 113 with the feed water discharge connection 116 in the head 115. Vapor from the air ejector enters the air ejector condenser 113 through the flanged connection 117 and after being cooled leaves the condenser 113 through the vent piping 118. A drain connection 119 is provided in the bottom of the condenser 113.

The air ejector 120 (see Fig. 3) is mounted to communicate with the interior of the distilling condenser chamber 18 through its air inlet flange 121 connected to cover the orifice 91 in the cylindrical casing 12 (see Fig. 10). Steam is supplied to the ejector at the connection 122 and together with ejected air from the distilling condenser chamber 18 passes through the air ejector 120 and attached flanged pipe 123 to the flanged connection 117 on the air ejector condenser.

The flanged outlet connection 75 of the distilling condenser 55 (see Fig. 3) is communicated with the inlet connection 114 of the air ejector condenser 113 through the flanged elbow 124, the rotameter 125, and the flanged pipe 126. The flanged connection 76 of the distilling condenser 55 for excess circulating water is piped to an overboard discharge connection through the piping valve 127, the flanged pipe 128, the flanged pipe 129 with discharge end connecting flange 130. The pipe connection 128 is clamped to the cylindrical casing 12 by a conventional clamp means 131 (see Fig. 2) while the flanged pipe 129 passing under the cylindrical casing 12 and over the sub-base 102 is clamped to the latter adjacent to the connecting flange 130 by the conventional clamp means 131' (see Fig. 3). A flanged inlet connection 132 is provided in the pipe 129 (see Fig. 1) for a purpose hereinafter described. A pipe connection 133 is provided near the connecting flange 130 and will be further described hereinafter.

The feed water discharge connection 116 in the air ejector condenser 113 (see Fig. 3) is communicated with the orifice 92 in the bottom of the cylindrical casing 12 (see Fig. 8) through the flanged pipe 134, the flanged pipe 135, the valve 136, and the flanged pipe 137. A conventional clamp 138 serves to support the flanged pipe 135 (see Fig. 5) on the cylindrical casing 12. The valve 136 is provided with an extension handwheel 139 to bring it to the operating end for convenience in manipulating. The flanged pipe 135 is provided with a pipe connection outlet 140 whereby communication is made with the pipe connection 133 on the pipe 129 through the valve 141, the pipe 142, the union 143, and the pipe 144.

On top of the cylindrical casing 12 in communication with the orifice 99 (see Fig. 8) is the relief valve 145 which communicates through piping with the bilge of the ship. This piping (see Figs. 1 and 4) comprises the pipe nipple 146, the T 147, the nipple 148, the union 149, the pipe 150, the T 151, and the pipe connection 152 to the bilge (indicated in dot-and-dash lines).

The pipe 150 is supported on the cylindrical casing 12 by conventional clamp means 153. The vent piping 118 of the air ejector condenser is shown adapted to discharge into the relief valve piping T 147 (see Figs. 1 and 2) through the piping comprising the receiving funnel 154, the elbow 155, the pipe 156, the elbow 157, the nipple 158, the elbow 159, the nipple 160, the union 161, and the nipple 162. Discharging into the relief valve piping T 151 is the emergency condensate discharge piping (see Figs. 2 and 4), comprising the receiving funnel 163, the street elbow 164, the nipple 165, the elbow 166, the pipe 167, the elbow 168, the support clamp 169 supporting the pipe 170, the union 171, and the pipe nipple 172.

For withdrawing the condensate from the distilling condenser chamber 18 and impelling it to the condensate cooler 107 and beyond a condensate pump 173 is provided. For withdrawing the excess brine from the evaporating chamber 19 and impelling it to discharge overboard a brine discharge pump 174 is provided. These two pumps (see Fig. 2) are driven by a single motor 175 mounted in line with and between the pumps as a combined unit upon the side of the sub-base 102 by means of lugs 176. The condensate pump 173 is provided with the flanged inlet connection 177 and the flanged outlet connection 178. The brine discharge pump 174 is provided with the flanged inlet connection 179 and the flanged outlet connection 180.

The orifice 54 (see Fig. 10) in communication with distilling condenser chamber 18 is communicated with the condensate pump flanged inlet connection 177 through the flanged pipe 181 fitted with the glass gage assembly 182. The condensate pump outlet connection 178 is communicated with the condensate cooler inlet connection 109 through the piping (see Fig. 2) comprising the flanged pipe 183, the stop-check valve 184, and the flanged pipe 185. The flanged pipe 185 is provided with a small pipe connection 186 which communicates with the gland of the condensate pump shaft through the piping assembly 187 for gland sealing purposes. The condensate passes from the condensate cooler by way of the discharge connection 110 in communication with the condensate discharge control assembly 188, the operation of which will hereinafter be described. The condensate discharge control assembly 188 comprises the electrical salinity cell 189, the solenoid valve 190, distilled water tank connection 191, and emergency condensate discharge 192.

The orifices 97 in the operating end head 14, and 98 in the bottom of the cylindrical casing 12, communicate with the flanged inlet connection 179 of the brine discharge pump 174 through the following piping elements: The weir level controller 193 is mounted on the operating end head 14 with its flanged inlet connection 194 commanding the orifice 97 therein and has its discharge connection flange 195 communicating directly with the flanged inlet 179 of the brine discharge pump 174 through the flanged pipe 196. The orifice 98 (see Fig. 7) communicates with a flange connection 197 in the pipe 196 through the valve 198 and the flanged pipe 199. The brine discharge pump flanged outlet connection 180 communicates with the flanged inlet connection 132 on the pipe 129 (see Fig. 1) through the valve 200, the swing check valve 201, and the semi-circular flanged pipe 202 (see Fig. 1). A brine sampling cock 203 is comprised in the pipe 202 (see Figs. 3 and 2). In Fig. 6 is shown the gland sealing piping assembly 204 for the brine discharge pump shaft gland. The piping 204 communicates the head 106 of the condensate cooler 107 with the pump shaft gland assuring a liquid seal thereof.

The weir level controller 193 is preferably of the design described in the copending patent application Serial No. 441,184, filed April 30, 1942, by Eugene Porter Worthen.

For present purposes it is sufficient to set forth the essential elements, and leave the operation of the same to be further described hereinafter. The weir level controller 193 comprises the operating handwheel 205 which raises and lowers the stem 206 to which is attached the weir 207 slidable in bearing diaphragm 208. The diaphragm 208 divides the weir level controller 193 into the upper chamber 209 and the lower chamber 210. The upper chamber 209 communicates through the flanged inlet connection 194 with the orifice 97 as hereinbefore described. The lower chamber 210 communicates through the discharge connection flange 195 with the pipe 196 as hereinbefore described. A flanged pipe 211 communicates the evaporating chamber 19 with the upper chamber 209. Chamber 36 in the exterior head 25 of the heater 24 is communicated with the upper part of the evaporating chamber 19 through pipe connection 212 (see Figs. 10 and 5), the nipple 213, the elbow 214, the pipe 215, the valve 216, and the pipe 217. The valve 216 is provided with a small orifice in its valve disc to act as a vent to allow uncondensed vapors in the chamber 36 of the heater 24 to escape to the evaporating chamber 19.

Figure 4:
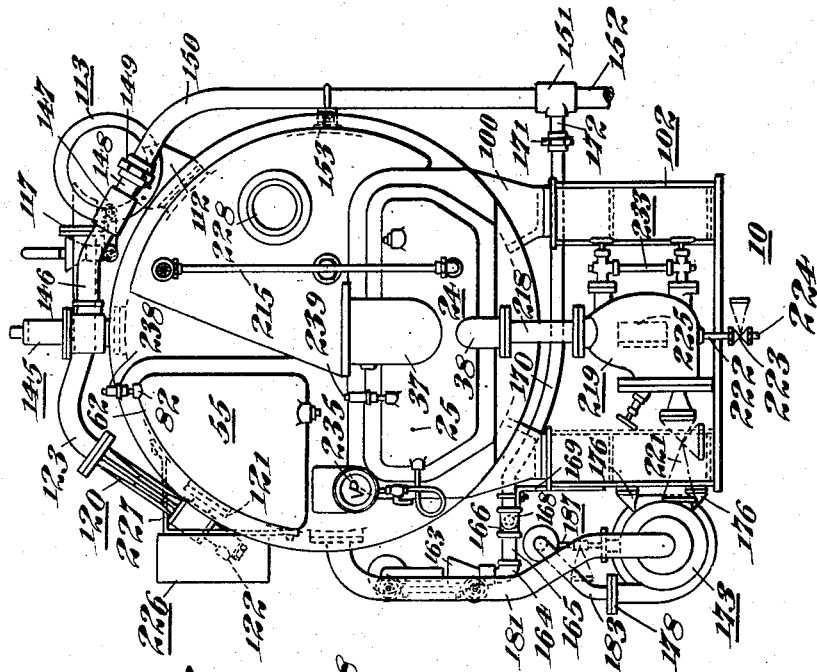
Fig. 4 is the opposite end elevation (steam inlet end) thereof.

Shown in Figs. 4 and 5 the heater tube nest drain discharge elbow 38 is in communication through flanged pipe 218 with the drain trap 219. The drain trap 219 normally discharges to the ship's main and auxiliary condenser piping through the discharge outlet connection 220 and valve 221, and is further provided with the emergency discharge to bilge through pipe 222, valve 223, and nipple 224. The drain trap 219 is mounted upon the steam inlet end of the sub-base 102 by means of the support bracket 225.

A salinity indicator panel 226 is mounted upon the pump side of the container shell 11 by means of brackets 227, and will be further described hereinafter.

Sight glasses for internal observation are provided as follows: Sight glass 228 on the steam inlet end head 12; sight glass 229 on the operating end head 14; and sight glass 230 on the weir level controller 193.

Gage glass assemblies are provided as follows: gage glass assembly 231 for the evaporating chamber 19 mounted on the operating end head 14 (see Fig. 3); gage glass assembly 182 for the distilling condenser discharge pipe 181 (see Fig. 2); gage glass assembly 232 for the weir level controller 193 (see Fig. 3); and gage glass assembly 233 for the drain trap 219 (see Fig. 5).

Pressure gages are provided as follows: Pressure gage 234 for the evaporating chamber 19 mounted on the operating end head 14 (see Fig. 3); and pressure gage 235 for the heater tube nest chamber 36 mounted on the exterior head 25 of the heater 24 (see Fig. 4).

Thermometers are provided as follows: Thermometer 236 for the evaporating chamber 19 mounted on the operating end head 14 (see Fig. 3); and thermometer 237 for the distilling condenser tube nest chamber 73 mounted on the conduit head 56 (see Fig. 3).

A relief valve 238 is provided in the connection 82 for the chamber 81 in the cover plate head 62 of the distilling condenser 55 (see Fig. 4).

We will now describe the operation of our improved apparatus for evaporating and distilling sea water as used on board ships. From the detail description of our apparatus as hereinbefore set forth it will be recognized that our invention comprises the placing within a single shell container the chief essential elements of a single effect evaporating and distilling unit, and the placing upon and about the said container the various instrumentalities for causing the sequential and cooperating flow of liquids and vapors in and through the said essential elements and instrumentalities during the operation of evaporating and distilling pure water from sea water. The operation is as follows:

Sea water pumped from the ship's sea chest enters our apparatus at the valve 105 and passes to and through the condensate cooler 107 wherein due to heat exchange with the condensate therein the sea water absorbs heat and passes on through conduit 111 to the inlet 74 of the distilling condenser 55. The sea water flowing through the distilling condenser 55 within the distilling condenser chamber 18 traverses sequentially the following circulating conduit elements therein: chamber 71, tubes 65, chamber 80, tubes 66, chamber 72, tubes 67, chamber 81, tubes 68, and chamber 73. From the chamber 73 a large percentage of the circulating sea water having served its purpose of a heat exchange medium in its passage through the distilling condenser 55 is discharged to overboard through the outlet connection 76, and conduit elements, valve 127, pipe 128, pipe 129, and connecting flange 130. The remaining percentage of the circulating sea water in chamber 73 having been further heated in its passage through the distilling condenser 55 is discharged through the outlet connection 75, and conduit elements, elbow 124, rotameter 125, pipe 126, and into the inlet 114 of the air ejector condenser 113. The rotameter 125 is a well known flow meter which accurately measures the rate of flow of the feed water and gives a continuous visual reading thereof. For the third time the circulating sea water in passing through the air ejector condenser 113 acts as a heat exchange medium and is preheated thereby. The circulating sea water leaving the outlet connection 116 in the air ejector condenser 113 now becomes the feed water of our apparatus and passes through the conduit elements pipe 134, pipe 135, valve 136, pipe 137, orifice 92 and through the perforated discharge pipe 93 within the bottom of the evaporating chamber 19, and wherein the said feed water now becomes the distilland thereof.

For emergency purposes a by-pass connection is provided in the pipe 135 whereby the feed water, or a percentage thereof, may be diverted to overboard through the conduit elements, outlet pipe 140, valve 141, pipe 142, union 143, pipe 144, pipe connection 133, and into the overboard discharge pipe 129. In addition, this connection maintains a flow of water through the tubes of the air ejector condenser during the starting up period when no feed is flowing or at other times when the normal flow of feed is interrupted in order to condense the vapors coming from the air ejector.

While the feed water has been flowing to become the distilland within the evaporating chamber 19 steam from the ship's auxiliaries has been flowing to the heater 24 in the evaporating chamber 19 into and through the conduit elements thereof inlet 37, chamber 35, tubes 30, chamber 39, tubes 31, chamber 36, and discharges as condensate from the heater 24 to and through the conduit elements outlet 38, pipe 218, drain trap 219, outlet connection 220, and valve 221 to the ship's main and auxiliary condenser conduits. An emergency discharge is provided from the drain trap 219 through the conduit elements pipe 222, valve 223, and nipple to the ship's bilge.

In the passage of the steam through the heater 24 as just described enough heat therefrom has been exchanged to the distilland within the evaporating chamber 19 to vaporize a portion thereof. As the vapor so generated rises from the surface of the distilland it passes to the top portion of the evaporating chamber 19 to and through the vapor separator 44 commanding the orifice 43 leading to the distilling condenser chamber 18. Passing through the separator 44 the entrained water in the vapor is extracted and returned to the main body of the distilland below. A portion of the entrained water drops from the face of the separator 44 to the distilland below, while the balance extracted by the separator 44 is returned to the distilland below beneath its surface by means of the discharge conduit 51. The dried vapor passes on to the distilling condenser chamber 18 and flows over and around the circulating conduit elements of the distilling condenser 55 thus heating the flowing sea water therein as hereinbefore described. The condensate formed from the vapor during this heating of the sea water is collected in the trough space 53 at the bottom of the distilling condenser chamber 18. The dried vapor meanwhile flows outwardly over and around the circulating conduit elements of the condenser 55, to and through the orifices 87 in the baffle 85, over and around the enclosed tubes 65 within the air cooler chamber 86, to and through the orifices 90 in the baffle 84 to the air space 89. The air space 89 is in communication with the air ejector 120 through the orifice 91 in the cylindrical casing 12 and conduit element 121. The air ejector 120 is functioned by a steam jet fed from a connection 122 to the ship's auxiliary steam line which passing through the air ejector 120 in a well known manner tends to create a vacuum in the distilling condenser chamber 18 thus acting to draw off the remaining vapor therein and also to establish a pressure differential with respect to the evaporating chamber 19. The air ejector 120 discharges by way of conduit elements 123 and 117 into the air ejector condenser 113, where, in a manner well known to the art, the non-condensing vapors are exhausted to the atmosphere through the conduit outlet 118, and the condensate formed therein is discharged to the ship's drain tank (not shown) through the drain conduit 119.

We return now to the condensate formed and collected, as hereinbefore described, in the trough space 53 at the bottom of the distilling condenser chamber 18. The condensate so formed is withdrawn from the space 53 by the condensate pump 173 through the conduit elements orifice 54, pipe 181, and pump inlet 177, and is impelled by the condensate pump 173 to the condensate cooler 107 through the conduit elements pump outlet 178, pipe 183, stop-check valve 184, pipe 185, and inlet connection 109. The condensate passing through the condensate cooler 107 acts to preheat the sea water as hereinbefore described and is discharged therefrom through the conduit discharge element 110 to the condensate discharge control assembly 188 and thence to the ship's fresh water tanks or to the ship's bilge as will now be described.

The condensate discharge control assembly 188 comprises an electrical salinity cell 189 and a solenoid operated trip valve 190. The purpose of the salinity cell is to give a continuous indication of the salinity of the flowing condensate on the salinity indicator panel 226 and to control the action of the solenoid trip valve 190. The solenoid trip valve 190 is connected to a relay in the salinity indicator panel 226 which in turn is energized by the salinity cell in such a way that whenever the salinity of the condensate exceeds a predetermined permissible amount the solenoid valve trips and diverts the condensate from the ship's tanks (normally discharged thereto by way of conduit 191) to the ship's bilge (by way of conduit elements 192, 163 to 172, inclusive, and conduit 152). When the salinity has again fallen to the permissible amount the solenoid valve may be reset manually to again send the fresh water to the ship's tanks. The salinity cell and the salinity indicator panel provide the operator of our apparatus with a visual indication of the amount of salinity of the product at all times, while the solenoid trip valve prevents bad water from being sent to the ship's tanks even though the plant may be unattended.

For controlling the distilling water required for the operation of our apparatus we prefer to embody the principles of operation and the instrumentalities therefor shown and described in the copending patent application Serial No. 441,184, filed April 30, 1942, by Eugene Porter Worthen. This comprises means to control the operating rate of flow of the distilling liquid to the evaporating chamber of our apparatus in constant substantial excess of that removed by evaporation therein, and a conduit system comprising an adjustable weir discharge means for receiving the excess liquid flow from the evaporating chamber whereby the liquid level therein may be maintained regardless of the operating rate of liquid flow thereto, and whereby the said liquid level may be selectively changed by the operator without affecting the said operating rate of liquid flow, and if desired the rate of flow may be modified without affecting the height of level selected. The means to control the operating rate of flow in our apparatus is the valve 136 in the feed water conduit hereinabove described. This valve 136 will be set manually to give approximately the right ratio of feed to fresh water for the brine density desired in its discharge from the apparatus. The adjustable weir discharge means 193 is adapted to maintain the level of the distilland within the evaporating chamber 19 constant at the level selected by the operator and while so doing to continuously receive the excess distilland from the evaporating chamber 19 by way of the conduit 194 and to discharge it overboard. As the upper chamber 209 is in communication with the evaporating chamber 19 by way of the vent conduit 211 the two chambers are in vapor balance one with another and water flowing into the chamber 209 will rise until it overflows and discharges through the top of the adjustable weir 207. The height of the distilland in the evaporating chamber 19 is therefore dependent upon the up-and-down setting of the adjustable weir 207 as controlled by the handwheel 205 upon the screw stem 206. The distilland overflowing the top of the weir 207 discharges to the lower chamber 210 and is pumped therefrom by way of the conduit 196 by the brine discharging pump 174 which impels it onward to the overboard discharge conduit 129 by way of the conduit elements 200 to 202, inclusive. A pumping-out conduit 199 communicates the bottom of the evaporating chamber 19 with the conduit 196 and is controlled by the valve 198.

Figure 1:
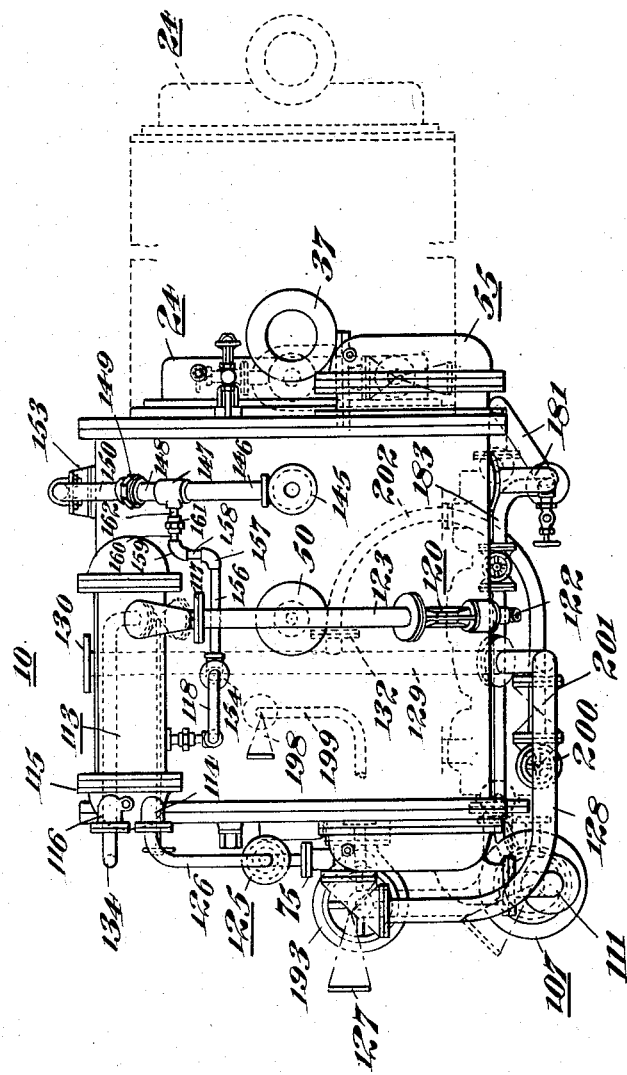
Figure 1 is a plan view of our improved apparatus.

In Figure 1 we have shown in dotted lines how the heater unit 24 may be entirely removed from the container shell 11 when desired for the purpose of inspection or cleaning.

It will now be apparent that we have devised a novel apparatus for evaporating and distilling especially applicable to marine purposes but it will be manifest that it is useful and valuable for application in other fields. The invention herein disclosed is in the nature of our improvement of the apparatus for evaporating and distilling shown and described in the Letters Patent of the United States No. Re. 21,129 granted to Benjamin Fox et al., June 27, 1939, and in the copending patent application Serial No. 441,184, filed April 30, 1942, by Eugene Porter Worthen.

Although we have described and illustrated our invention in considerable detail, we do not wish to be limited to the exact and specific details thereof as shown and described, but may use such modifications in, substitution for or equivalent thereof, as are embraced within the scope of our invention or as pointed out in the claims.

Having thus described our invention what we claim as new and desire to secure by Letters Patent is:

1. In apparatus for distilling a liquid, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment being connected to receive vapor from said first compartment, conduit means for conducting liquid to be distilled successively in heat exchanging relationship with vapor in said second compartment and then into said first compartment, means for supplying a heating fluid into the conduit of said heater means in said first compartment whereby the liquid therein is evaporated and some of the vapor evolved is condensed in said second compartment by heat exchange with the conducting means of the incoming liquid, conduit means for conducting excess distilland from said first compartment to waste, means for collecting for use condensate formed in said second compartment, and vapor exhausting means communicating with said second compartment.

2. In apparatus for distilling a liquid, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment being connected to receive vapor from said first compartment, conduit means for conducting cooling liquid in excess of distilland requirements in heat exchanging relationship with vapor in said second compartment, conduit means for discharging said excess liquid from said distilling apparatus, conduit means for conducting said distilland requirement liquid into said first compartment, means for supplying a heating fluid into the conduit of said heater means in said first compartment whereby the liquid therein is evaporated and some of the vapor evolved is condensed in said second compartment by heat exchange with the conducting means of the incoming liquid, conduit means for conducting excess distilland from said first compartment to waste, means for collecting for use condensate formed in said second compartment, and vapor exhausting means communicating with said second compartment.

3. In apparatus for distilling a liquid, a unitary structure comprising a supporting base, a container, wall means within said container dividing the same into a first compartment and a second compartment, heater means in said first compartment comprising a conduit for conducting fluids in heat exchanging relationship with liquid to be evaporated in said first compartment, said second compartment being connected to receive vapor from said first compartment, condensate cooler means, air ejector condenser means, conduit means comprising a control valve for conducting liquid to be distilled successively in heat exchanging relationship with heated fluids in said condensate cooler means, said second compartment, and said air ejector condenser and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector for exhausting vapor from said second compartment to said air ejector condenser, means for supplying an operating fluid into the conduit of said air ejector, conduit means comprising an adjustable weir and a second pump for conducting excess distilland to waste, and a motor means for operating said first and second pumps.

4. In apparatus for distilling a liquid, a unitary structure comprising a supporting base, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment being connected to receive vapor from said first compartment, condensate cooler means, air ejector condenser means, conduit means comprising a control valve for conducting liquid to be distilled successively in heat exchanging relationship with heated fluids in said condensate cooler means, said second compartment, and said air ejector condenser and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector for exhausting vapor from said second compartment to said air ejector condenser, means for supplying an operating fluid into the conduit of said air ejector, conduit means comprising an adjustable weir and a second pump for conducting excess distilland to waste, and a motor means for operating said first and second pumps.

5. In apparatus for distilling a liquid, a unitary structure comprising a supporting base, a container, wall means within said container dividing the same into a first compartment and a second compartment, heater means in said first compartment comprising a conduit for conducting fluids in heat exchanging relationship with liquid to be evaporated in said first compartment, said second compartment being connected to receive vapor from said first compartment, condensate cooler means, air ejector condenser means, conduit means for conducting cooling liquid in excess of distilland requirements in heat exchanging relationship with fluids in said condensate cooler and said second compartment, conduit means for discharging said excess liquid from said distilling apparatus, conduit means comprising a control valve for conducting said distilland requirement liquid in heat exchanging relationship with fluid in said air ejector condenser and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector for exhausting vapor from said second compartment to said air ejector condenser, means for supplying an operating fluid into the conduit of said air ejector, conduit means comprising an adjustable weir and a second pump for conducting excess distilland to waste, and a motor means for operating said first and second pumps.

6. In apparatus for distilling a liquid, a unitary structure comprising a supporting base, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment being connected to receive vapor from said first compartment, condensate cooler means, air ejector condenser means, conduit means for conducting cooling liquid in excess of distilland requirements in heat exchanging relationship with fluids in said condensate cooler and said second compartment, conduit means for discharging said excess liquid from said distilling apparatus, conduit means comprising a control valve for conducting said distilland requirement liquid in heat exchanging relationship with fluid in said air ejector condenser and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector for exhausting vapor from said second compartment to said air ejector condenser, means for supplying an operating fluid into the conduit of said air ejector, conduit means comprising an adjustable weir and a second pump for conducting excess distilland to waste, and a motor means for operating said first and second pumps.

7. In apparatus for distilling a liquid, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment comprising a vapor inlet and a vapor outlet, a vapor separator unit mounted over said vapor inlet whereby said second compartment is connected to receive vapor from said first compartment, conduit means for conducting liquid to be distilled successively in heat exchanging relationship with vapor in said second compartment and then into said first compartment, means for supplying a heating fluid into the conduit of said heater means in said first compartment whereby the liquid therein is evaporated and some of the vapor evolved is condensed in said second compartment by heat exchange with the conducting means of the incoming liquid, conduit means for conducting excess distilland from said first compartment to waste, means for collecting for use condensate formed in said second compartment, and vapor exhausting means communicating with said vapor outlet of said second compartment.

8. In apparatus for distilling a liquid, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment comprising a vapor inlet and a vapor outlet, a vapor separator unit mounted over said vapor inlet whereby said second compartment is connected to receive vapor from said first compartment, conduit means for conducting cooling liquid in excess of distilland requirements in heat exchanging relationship with vapor in said second compartment, conduit means for discharging said excess liquid from said distilling apparatus, conduit means for conducting said distilland requirement liquid into said first compartment, means for supplying a heating fluid into the conduit of said heater means in said first compartment whereby the liquid therein is evaporated and some of the vapor evolved is condensed in said second compartment by heat exchange with the conducting means of the incoming liquid, conduit means for conducting excess distilland from said first compartment to waste, means for collecting for use condensate formed in said second compartment, and vapor exhausting means communicating with said vapor outlet of said second compartment.

9. In apparatus for distilling a liquid, a unitary structure comprising a supporting base, a container, wall means within said container dividing the same into a first compartment and a second compartment, heater means in said first compartment comprising a conduit for conducting fluids in heat exchanging relationship with liquid to be evaporated in said first compartment, said second compartment comprising a vapor inlet and a vapor outlet, a vapor separator unit mounted over said vapor inlet whereby said second compartment is connected to receive vapor from said first compartment, condensate cooler means, air ejector condenser means, conduit means comprising a control valve for conducting liquid to be distilled successively in heat exchanging relationship with heated fluids in said condensate cooler means, said second compartment, and said air ejector condenser and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector communicating with said vapor outlet in said second compartment for exhausting vapor therein to said air ejector condenser, means for supplying an operating fluid into the conduit of said air ejector, conduit means comprising an adjustable weir and a second pump for conducting excess distilland to waste, and a motor means for operating said first and second pump.

10. In apparatus for distilling a liquid, a unitary structure comprising a supporting base, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment comprising a vapor inlet and a vapor outlet, a vapor separator unit mounted over said vapor inlet whereby said second compartment is connected to receive vapor from said first compartment, condensate cooler means, air ejector condenser means, conduit means comprising a control valve for conducting liquid to be distilled successively in heat exchanging relationship with heated fluids in said condensate cooler means, said second compartment, and said air ejector condenser and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector communicating with said vapor outlet in said second compartment for exhausting vapor therein to said air ejector condenser, means for supplying an operating fluid into the conduit of said air ejector, conduit means comprising an adjustable weir and a second pump for conducting excess distilland to waste, and a motor means for operating said first and second pumps.

11. In apparatus for distilling a liquid, a unitary structure comprising a supporting base, a container, wall means within said container dividing the same into a first compartment and a second compartment, heater means in said first compartment comprising a conduit for conducting fluids in heat exchanging relationship with liquid to be evaporated in said first compartment, said second compartment comprising a vapor inlet and a vapor outlet, a vapor separator unit mounted over said vapor inlet whereby said second compartment is connected to receive vapor from said first compartment, condensate cooler means, air ejector condenser means, conduit means for conducting cooling liquid in excess of distilland requirement in heat exchanging relationship with fluids in said condensate cooler and said second compartment, conduit means for discharging said excess liquid from said distilling apparatus, conduit means comprising a control valve for conducting said distilland requirement liquid in heat exchanging relationship with fluid in said air ejector condenser, and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector communicating with said vapor outlet in said second compartment for exhausting vapor therein to said air ejector condenser, means for supplying an operating fluid into the conduit of said air ejector, conduit means comprising an adjustable weir and a second pump for conducting excess distilland to waste, and a motor means for operating said first and second pumps.

12. In apparatus for distilling a liquid, a unitary structure comprising a supporting base, a horizontal cylindrical container comprising substantially radial wall means longitudinally disposed within said container dividing the same into a first compartment and a second compartment, said second compartment comprising substantially a quarter sector defined by said radial walls and the included peripheral arc of said container, one of said radial walls being substantially vertical and within the upper half of said container, heater means in said first compartment comprising a conduit for conducting fluids in heat exchanging relationship with liquid to be evaporated in said first compartment, said second compartment comprising a vapor inlet and a vapor outlet, a vapor separator unit mounted over said vapor inlet whereby said second compartment is connected to receive vapor from said first compartment, condensate cooler means, air ejector condenser means, conduit means for conducting cooling liquid in excess of distilland requirements in heat excahnging relationship with fluids in said condensate cooler and said second compartment, conduit means for discharging said excess liquid from said distilling apparatus, conduit means comprising a control valve for conducting said distilland requirement liquid in heat exchanging relationship with fluid in said air ejector condenser and then into said first compartment, means for supplying a heating fluid into the conduit of said heater means in said first compartment whereby the liquid therein is evaporated and some of the vapor evolved is condensed in the second compartment by heat exchange with the conducting means of the incoming liquid, conduit means comprising a first pump for conducting the condensate formed in said second compartment through said condensate cooler means to fresh water discharge, conduit means comprising an air ejector communicating with said vapor outlet in said second compartment for exhausting vapor therein to said air ejector condenser, means for supplying an operating fluid into the conduit of said air ejector, conduit means comprising an adjustable weir and a second pump for conducting excess distilland to waste, and a motor means for operating said first and second pumps.

EUGENE PORTER WORTHEN.
BENJAMIN FOX.